Aug. 30, 1932.  H. G. SMITH  1,874,647
VEHICLE SPRING
Filed Feb. 7, 1930
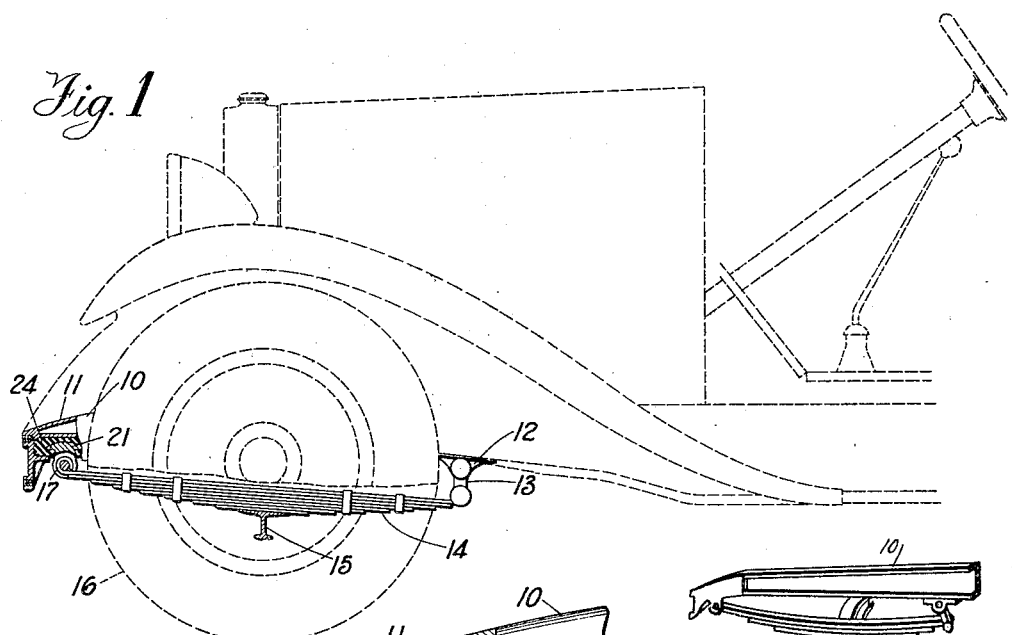
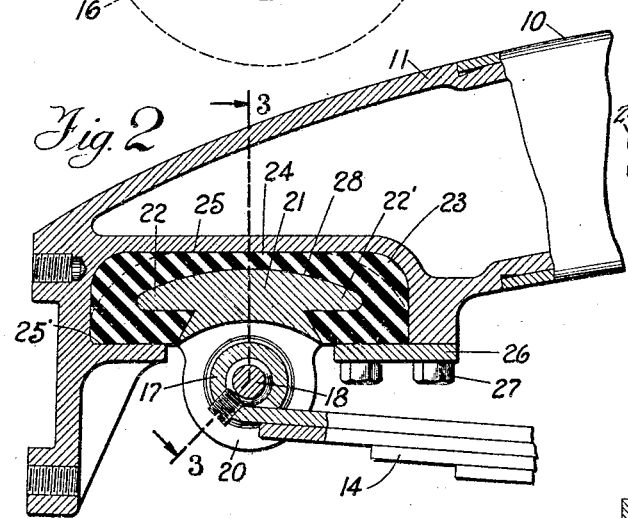
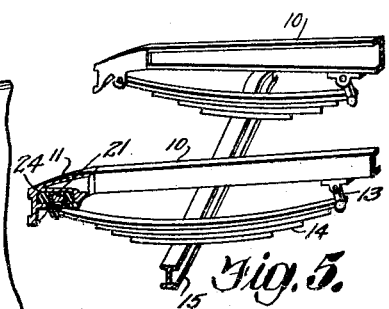
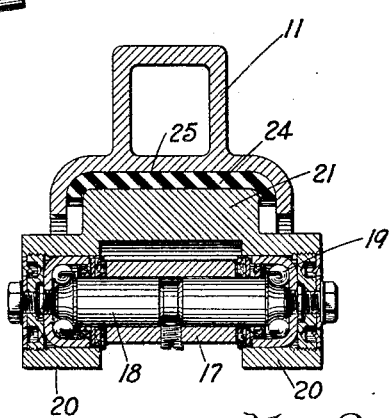
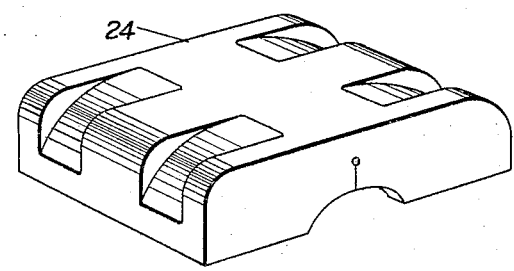
INVENTOR.
Harry G. Smith
BY
P. W. Pomeroy
ATTORNEY Patented Aug. 30, 1932

1,874,647

UNITED STATES PATENT OFFICE

HARRY G. SMITH, OF MISHAWAKA, INDIANA, ASSIGNOR TO THE STUDEBAKER CORPORATION, OF SOUTH BEND, INDIANA, A CORPORATION OF NEW JERSEY

VEHICLE SPRING

Application filed February 7, 1930. Serial No. 426,528.

This invention relates to the springs for supporting the frame of a motor vehicle on the axles thereof and more especially to the springs for supporting the frame on the axle carrying the road steering wheels.

Since balloon and semi-balloon tires have been used on motor vehicles considerable difficulty has been experienced because of the "shimmy" and "tramping" of the vehicle which has caused these objectionable vibrations to be transmitted to the steering wheel which is very annoying, and in many cases dangerous to the occupants of the vehicle. Various attempts have been made to eliminate or absorb these vibrations but in doing so the steering of the vehicle has been interfered with which produces difficulties in many cases as objectionable as the vibrations.

One of the objects of the present invention is to provide a construction which will absorb the "shimmy" and/or "tramping" of the vehicle and at the same time improve the steering of the vehicle thus eliminating the difficulties heretofore encountered and bring the parts of the vehicle into such relationship that the vibrations will be prevented or controlled whereby the driver and other occupants of the vehicle will not be subject to the annoyances heretofore experienced.

Another object of the invention is to provide a construction which will permit of slight yielding of one of the spring connections under conditions so that the movement of the axle may accommodate itself more nearly to the arc of the steering connecting rod or drag link and thereby prevent deflection of the wheels or steering knuckles under road conditions which tend to cause vibration of the vehicle parts.

A further object is to provide a yielding connection for the spring on the frame at one side of the vehicle to break up and dissipate the vibrations which may be started in the axle and frame so that these vibrations will not be transmitted to the steering gear.

A further object is to provide a resilient support for one end of one of the springs which is supported at its opposite end by a shackle to the frame and intermediate its ends on the axle, the spring being normally held in neutral position in its resilient support.

A still further object is to provide an attaching means for the front end of the spring at the steering side of the motor vehicle which comprises a resilient member carried by the frame in which is supported a non-resilient member carrying the front end of the spring so as to obtain a slight movement of the front axle forwardly and rearwardly to eliminate the reactions of steering.

Further objects and objects relating to details of construction and manufacture will be apparent from the detailed description to follow, and then claimed, having the above and other objects in view.

In the accompanying drawing which shows a suitable embodiment of the present invention, Figure 1 is a fragmentary side elevational view of a motor vehicle, certain parts being broken away and other parts shown in dotted lines to more fully illustrate the invention.

Figure 2 is an enlarged fragmentary sectional view showing the means for supporting the end of the spring in the vehicle frame.

Figure 3 is a transverse sectional view taken substantially on the line 3—3 of Figure 2.

Figure 4 is a perspective view showing the resilient member in which the spring end support is mounted.

Figure 5 is a perspective view on a reduced scale showing the two front springs of the vehicle together with fragmentary portions of the chassis frame and front axle.

Referring to the accompanying drawing in which like numerals refer to like parts throughout the several views, the frame side member 10 is provided with a spring hanger member 11 at its forward end and with a bracket 12 rearwardly therefrom carrying a shackle 13 pivotally connected with the spring 14 at the rear end thereof. The spring 14 is supported intermediate its ends on the axle 15 carrying the road steering wheels 16. The forward end of the spring 14 is formed to provide an eye 17 in which is mounted a shackle pin 18 forming a part of a bearing referred to generally by the number 19.

Although I have shown a ball bearing to be used at the forward end of the spring 14, it is not my intention to be limited to this design of bearing as any of the various designs of mountings now available to those skilled in the art such as a roller, bronze or other type of bearing may be used without departing from the spirit and scope of this invention. The pin 18 is journaled in a supporting member 20, as is clearly shown in Figure 3, which has at its upper end a head portion 21 provided with forwardly and rearwardly extending flanges 22 and 22' for a purpose to be hereinafter described. The spring hanger 11 is provided with a recess 23 bounded by the wall 25 and ledge 25' in which is adapted to be inserted a resilient block 24 which may be formed of a rubber compound, although other suitable substances may be used, the resilient member 24 then being held in position by the plate 26 secured on the spring hanger 11 by the bolts 27. The resilient member 24 is formed to provide a recess 28 corresponding in shape and adapted to receive the head 21 of the member 20, as is shown in Figure 2. Although I have shown the resilient member 24 as adapted to be inserted in the pocket 23 formed in the spring member 11 and secured in place therein by means of the plate 26, it will be understood that if desired the frame end 11 and spring hanger member 20 may be inserted in a mould and the resilient member 24 may be bonded to either or both of these respective members by vulcanizing or other suitable means for assembly.

In Figure 5 I have illustrated the spring and its mounting at the side opposite the vehicle from the spring mounting heretofore described. It is understood that if so desired, I may use a mounting for the spring like that shown, or in may instances it may be desirable to use a spring mounting having a fixed pivot at one end of the spring with the frame and a shackle connection at the other end, as is the present conventional construction in spring mountings as used on practically all makes of automobiles.

By the use of the resilient mounting for the spring at the forward end thereof as is shown in Figure 2, the axle 15 is permitted to have a limited fore and aft movement, which movement will cause the flange portions 22 and 22' on the member 20 to move longitudinally relative to the spring hanger 11 and rock or pivot in the resilient member 24 against the displacement of the resilient material which will act as an insulator and absorb vibrations set up by the road wheel or frame whereby those vibrations will not be transmitted through the steering gear to the steering wheel which must necessarily be connected with the steering road wheels.

In the construction above described it will be seen that the spring suspension of the vehicle frame relative to the axle is accomplished on one side of the vehicle by means of a spring assembly secured to the frame member at one end by a shackle and at the other end by a flexible mounting in which the pivotal axis of the spring is capable of being displaced under varying conditions of travel of the vehicle. By the use of the spring mounting above described, it has been found that vibrations which have been heretofore apparent to the driver and other occupants of the vehicle are eliminated and that the life of the vehicle parts subjected to these vibratory movements has been materially increased.

While I have shown one embdiment of my invention, it will be understood to those skilled in the art that formal changes and changes relating to details of construction and manufacture will be apparent without departing from the spirit and substance of the invention, the scope of which is commensurate with the appended claims.

What I claim is:

1. In a motor vehicle, the combination with the frame and the axle, of a spring rigidly connected intermediate its ends to said axle, a shackle connection between one end of said spring and said frame, and a yielding connection between the opposite end of said spring and frame, said connection comprising, a rubber block having a recess therein mounted in a recess formed in said frame, and a member directly supporting said spring having a head therein received in the recess in said rubber block and supported thereby, whereby said spring will have a limited amount of longitudinal motion relative to said frame.

2. In a motor vehicle, the combination with the frame and the axle, of a spring rigidly connected intermediate its ends to said axle, a shackle connection between the rear end of said spring and said frame, a spring hanger having a recess formed therein secured to the front of said frame, a resilient rubber block within said recess, a spring supporting member mounted in said resilient member directly pivotally supporting the front end of said spring whereby said spring may have a limited longitudinal motion relative to said frame to absorb shocks transmitted from said axle to said spring.

3. In a motor vehicle, the combination with the frame of the vehicle and the axle; of means to resiliently mount the frame on the axle comprising, springs secured to the frame and axle at opposite sides of the frame; of means for mounting one of said springs to move in its flexure about a fixed axis; and means for mounting the other of said springs to move in its flexure about an axis shiftable relative to the frame of the vehicle, said last means comprising, a spring hanger on said frame having a recess therein, a hollow rubber block in said recess, and a member directly pivoted to one end of said spring having an enlarged portion secured in said rubber block.

4. In a motor vehicle, the combination with the frame of the vehicle and the axle; of means to resiliently mount the frame on the axle comprising, springs secured intermediate their ends to the axle and having their ends secured to the frame; of means for mounting one of said springs to move in its flexure about a fixed axis; and means for mounting the other of said springs to move in its flexure about an axis shiftable relative to the frame of the vehicle, said last means comprising, a spring hanger on the front of said frame having a recess therein, a hollow rubber block in said recess, and a member directly pivoted to the front end of one of said springs having an enlarged portion secured in said rubber block.

5. In a motor vehicle, a frame comprising, a pair of side frame members rigidly secured together, an axle, means to resiliently mount the frame on the axle comprising, springs, each spring being secured to the axle intermediate its ends and having its ends pivotally secured to one of said side frame members, a shackle interposed between the rear end of each of said springs and its adjacent side frame member, a pivotal connection between the front end of one of said springs and its side frame member, and a resilient pivotal connection between the front end of the other of said springs and its side frame member comprising, a member having an enlarged portion pivotally secured to the front end of said spring, a recess formed in the front of the side frame member, and a hollow rubber block in said recess, the enlarged portion of said member being inserted in said rubber block and retained thereby in said recess.

Signed by me at South Bend, Indiana, this 4th day of February, 1930.

HARRY G. SMITH.